United States Patent [19]
Schimkat

[11] 3,771,619
[45] Nov. 13, 1973

[54] STEERING ARRANGEMENT FOR VEHICLES WITH A STEERING SERVO MECHANISM

[75] Inventor: Harald Schimkat, Flechtorf, Germany

[73] Assignee: Volkswagenwerk Aktiengesellschaft, Wolfsburg, Germany

[22] Filed: July 25, 1972

[21] Appl. No.: 274,913

[30] Foreign Application Priority Data
July 28, 1971   Germany.................... P 21 28 356.7

[52] U.S. Cl. .............................. 180/79, 180/79.2 R
[51] Int. Cl. ............................................. B62d 5/00
[58] Field of Search............................ 180/79, 79.2; 74/388 PS

[56] References Cited
UNITED STATES PATENTS

| | | | |
|---|---|---|---|
| 2,865,462 | 12/1958 | Milliken et al................. | 180/79.2 R |
| 2,902,104 | 9/1959 | Schilling........................ | 180/79.2 R |
| 3,576,230 | 4/1971 | Taplin et al.................... | 180/79.2 R |

*Primary Examiner*—Evon C. Blunk
*Assistant Examiner*—Johnny D. Cherry
*Attorney*—Ernest F. Marmorek

[57] ABSTRACT

In a motor vehicle, a steering arrangement with a steering servo mechanism a first and a second lever for transmitting a rotational momentum, the first lever being coupled for transmitting momenta corresponding to steering instructions of the driver, the second lever being coupled for transmitting momenta produced by the steering servo mechanism, both levers being coupled for transmitting the respective momenta to a lever arrangement coupled with the wheels of the vehicle, the first lever providing a supporting momentum for the lever arrangement coupled with the vehicle wheels at the introduction thereto of the momenta delivered by the steering servo mechanism, a spring and damping arrangement for transmitting supporting static momenta to the first lever when the steering servo mechanism delivers momenta thereto, the second lever consisting of a pair of partial levers, the first partial lever being coupled with the steering servo mechanism at all steering angles and with the spring and damping arrangement transmitting the aiding momentum which aid the driver, the second partial lever being coupled with the first lever at all steering angles, the second partial lever being coupled with the first partial lever only at steering angles lying on a predetermined range of steering, a fixed member for arresting the second partial lever at steering angles lying beyond the predetermined range of steering angles.

11 Claims, 4 Drawing Figures

STEERING ARRANGEMENT FOR VEHICLES WITH A STEERING SERVO MECHANISM

CROSS-REFERENCE TO OTHER APPLICATIONS

Reference should be had to the full contents of the copending application of Schimkat et al., filed Aug. 2, 1971, Ser. No. 168,186, under the title "Steering Arrangement For Vehicles, Expecially For Motor Vehicles, Having A Compensation For Sidewise Force Affects" and being assigned to the same Assignee as the present application, and is incorporated herein by way of reference.

FIELD OF THE INVENTION

The present invention relates generally to a steering arrangement, and more particularly, it relates to a steering arrangement having a compensating servo mechanism therein for fully or partially eliminating the effects caused by side forces acting on the vehicle by its improved steering servo mechanism.

BACKGROUND OF THE INVENTION

It has been known that especially fast traveling motor vehicles at the sudden appearance of side forces which, for example, can be caused by side winds, become exposed to the danger that they will undergo such accelerations transversely to the direction of the travel that the operator cannot affect a countersteering in due time. Such transverse movements may also be caused by the unevenness of the road bed or, for instance, by sudden changes in the state of the road surface; this may throw off the vehicle in various directions, that is, cause it to experience accelerations in such directions.

There have been already steering arrangements having control loops therein created for the compensation of the affect of disturbing side forces acting transversely on the direction of travel of the vehicle. A steering arrangement described in German Pat. No. 1,041,818, 63c-47 is of this type.

An arrangement considering questions in connection with steering stability is known from U.S. Pat. No. 2,865,462 of W.F. Milliken et al., issued Dec. 23, 1958.

The above-referenced co-pending application, in order to overcome the difficulties of known arrangements, proposes in a motor vehicle, the combination of a steering arrangement with a control or regulating means for compensating the influence of disturbing side forces on the traveling direction, the regulating means comprising at least a first reference signal generator producing signals corresponding to or representative of the transverse movements of the vehicle, a coupling member receiving the signals of the first reference signal generator, a second reference signal generator producing signals representative of the steering instructions coming from the operator of the vehicle, the signals of the second reference signal generator being applied to the coupling member, a first regulator device coupled to the coupling member, the latter forming a regulating magnitude from the signals of the first reference generator and of the second reference generator and delivering such magnitude to the first regulator device, a steering servo mechanism coupled to the first regulator, the coupling member comprising a subtraction member forming a difference of the signals of the first reference signal generator and the second signal generator, whereby the control magnitude will not only lead to eliminate the undesired side force affects but also to improve the traveling and steering relation of the operator in contrast to a vehicle which does not have the control arrangement proposed by the invention of the above-referenced application.

SUMMARY OF THE INVENTION

It is an object of the present invention to provide an improved steering mechanism over that of the aforementioned co-pending application and to provide for an improved operation of the steering servo mechanism.

It is another object of the present invention that notwithstanding the fact that the invention is especially advantageously applicable simultaneously with the use of a regulating loop serving for the compensation of the influence of disturbing side forces effecting the direction of travel as described in the aforementioned application, it is, however, also applicable when such regulating loop it not present.

With respect to the operation of a steering servo it is desirable that in its full angular aiding operation during the presence of steering instructions coming from the driver it should be effective only on a predetermined steering angle region so that in the event the steering servo mechanism becomes inoperational or defective, the steering signals delivered by it could be overridden. In the event that at the limits of such steering angle region the steering servo mechanism would be disconnected, then the aiding momentum delivered by the steering mechanism would also be disconnected.

The steering arrangement also here includes a pair of levers transmitting a rotational momentum. One of the levers forming a momentum support for the lever arrangement couples with the wheels when momenta are introduced to the lever arrangement produced by the servo mechanism, the other transmitting momenta produced by the driver, similarly as described in FIGS. 4 and 6 of the above-referenced application.

The steering servo mechanism according to the present invention has its advantage in that the steering servo with respect to the angular steering aid is effective only within a certain predetermined steering angle region, whereas with respect to the momentum aid or support it is effective also beyond such steering angle region. More particularly, in this respect its characteristic feature resides in that the other lever transmitting the momenta of the servo mechanism comprises a pair of partial levers of which the first partial lever is coupled with the steering servo mechanism at all steering angles and also with the means transmitting the aiding or supporting momentum for the drive, while the second partial lever is coupled with the first lever at all steering angles; however, it is coupled with the first partial lever only within a certain predetermined steering angle region and beyond such steering angle region it becomes arrested on a fixed or resting part, such as a housing portion.

It is pointed out also here, as has been pointed out also in the above-referenced co-pending application, that under the concept "lever" one should understand not necessarily only a true lever having a single or a double arm, since under this concept the scope of the invention includes also a member capable of serving for the introduction of rotational momentum or torque. As will be seen later in connection with the specific description of the preferred embodiments of the present invention with respect to the figures, under the concept of lever one can employ also a toothed wheel. The concept "partial lever" should not be limited to a member capable of transmitting forces in the direction of its axis only, since the scope of the present invention should include under this concept also partial levers comprising toothed wheels or partial levers which are made from different elements. It is essential for the invention that one of the levers should serve for the transmission of the momenta delivered by the steering servo and, that there is a subdivision into a pair of partial levers which are coupled or associated with means for selective coupling of such partial levers with each other or for the coupling of the second partial lever with a member in a fixed position not taking part in the movement of the first partial lever, such as a wall portion of the steering servo arrangement.

As has already been pointed out, both partial levers do not have to be constructed in a similar manner, that is, do not have to be the same machined elements. For example, it may be preferred that the first partial lever, independent from the magnitude of the steering angle present at that time, is in coupling relationship with the steering servo mechanism, and is in the form of a worm gear, while the second partial lever is formed as a fork and is, at all steering angles, coupled with a differential drive with which also the first lever is coupled at all steering angles. As has been pointed out already in the afore-referenced copending application, the first lever serves for transmitting the steering instructions coming from the driver. The differential drive also adds the angular adjustments resulting from the steering instructions and effecting the first lever as well as the angular adjustments of the second partial lever as produced by the steering servo and transmits it as a steering angle to a steering drive or gear.

The means for transmitting the supporting or aiding momentum can be selected, as explained in the afore-referenced co-pending application, to be active members as well as a further servo mechanism, or passive members which are provided with a damping selected in such a manner that they behave with respect to the transmission of the forces producing the supporting momentum as a high-pass means. Such passive members are, for example, damping members which can be coupled with spring means for the transmission of the momenta aiding the driver during the steering. Such means transmitting the momentum aiding the driver, according to an embodiment of the present invention, can be arranged between the first partial lever and a component of the lever arrangement placed on the driving shaft of one of the servo gears. They are also continuously coupled with the steering servo mechanism.

More particularly, the preferred embodiment of the present invention provides that both partial levers and the fixed or arresting part have only on the predetermined steering angle region a positive coupling and only between both partial levers, while outside or beyond such steering angle region such positive coupling is present only between the second partial lever and the fixed member. As has been mentioned above, the fixed member can be a wall portion of the housing of the steering servo arrangement.

In a further embodiment of the last-mentioned construction the second partial lever which is coupled with the first partial lever only within the predetermined steering angle region, carries a coupling member which can slide only transversely with respect to the direction of movement of the second partial lever into two positions. In one of its positions corresponding to the predetermined steering angle region said coupling member protrudes into a camming profile provided on the first partial lever, while in its other position associated with regions lying outside of the predetermined steering angle region, it projects into an arresting profile characteristic of one of the pair of limits of the predetermined steering angle region, such arresting profile being provided on the fixed member. Such profile on the first partial lever and on the fixed member, which can be a wall portion of the housing, can be in the form of portions of recesses for the coupling member made in an overlapping fashion in the first partial lever and in the arresting or fixed member. The recess formed in the first partial lever forms the free running part for the coupling member in the other position and such free running part overlaps the resting profile, while the recess formed in the resting or fixed member forms the free running part for the coupling member in the other position, such free running part overlapping the camming profile. The coupling member projects in each case into the recesses.

The recesses are formed in such a manner that the coupling member continuously projects into both recesses, although the recess formed in the first partial lever has a longitudinal slot which acts, similarly, like a free-running member and which overlaps or covers those regions of the recess in the fixed member which serve as the arresting profile. As a result, it is attained that the position of the coupling member when viewed in the direction of movement of the second partial lever, is always defined only by the camming profile or by the arresting profile, that is, always only by the recess formed in the two above-mentioned elements provided with the recesses, while the recess in the other element permits a relative movement between the coupling member (and thereby between the other partial lever) and between one of the elements provided with the recesses. Furthermore, the recesses are formed in such a fashion that, independently from the instantaneous angle, they shift the coupling member into its one or other position transversely with respect to the direction of motion of the second partial lever. For this purpose the coupling member is provided, for example, with a transversely running projection with which it slides in one of the recesses running in the same direction and provided in the second partial lever.

More particularly, the coupling member is made in the form of a parallelogram having one of its diagonals pointing in the direction of movement of the first partial lever, and such parallelogram being arranged fixedly against rotation. This fixing against rotation is automatically attained by guiding the coupling member in the second partial lever. The surfaces of the parallelogram-shaped coupling member together with the similarly aligned counter surfaces forming the above-mentioned profiles form a switching arrangement bringing about the transverse movement of the coupling member into its one or the other of the above-mentioned extreme positions. It is also important to note that the coupling member has slanted surfaces, and correspondingly slanted counter surfaces are present on the profiles, whereupon during the changes of the steering angle the coupling member automatically becomes shifted into the position associated with the particular steering angle while, on the other hand, there is a sliding transition from one region in which a momentum as well as an angular aiding or supporting takes place to regions in which the momentum support or aid is performed only by the steering servo alone.

The above described switching arrangement contains a pivotable lever pivotally mounted on the first partial lever and having a counter surface thereon for the coupling lever which is controlled by the projections provided on the fixed or resting member. During movement of the coupling member from one of its positions into the other of its positions, the pivotable lever will lie in front of the coupling member in the direction of movement, while during the movement of the coupling member from the other of its positions into the first of its positions it will lie behind it. During these movements the counter surface forms a guiding surface when movement is in one direction and a pressure surface when movement is in the other direction.

BRIEF DESCRIPTION OF THE DRAWINGS

The invention will become more readily apparent from the following description of preferred embodiments thereof shown, by way of example, in the accompanying drawings, in which.

DESCRIPTION OF THE PREFERRED EMBODIMENTS

Figure 1:
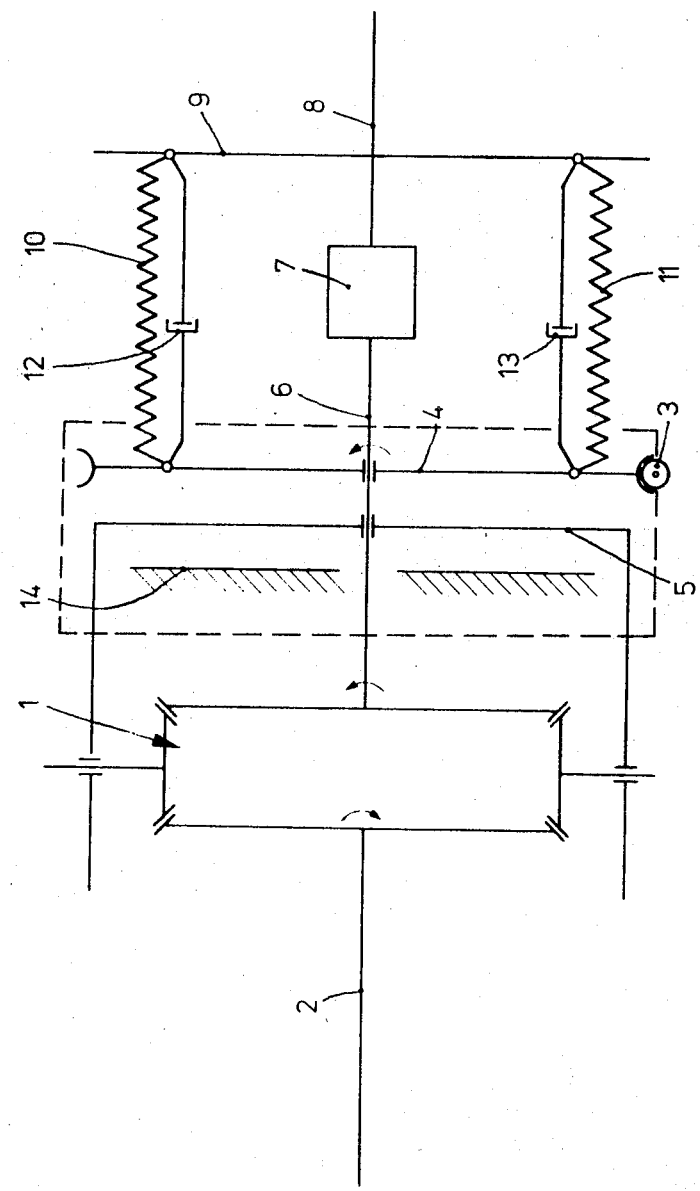
FIG. 1 is a schematic illustration of the steering arrangement according to the present invention in its entirety.

With reference to FIG. 1, the vehicle (not shown) comprises a differential gear 1 to which over a lever 2 the steering instructions coming from the driver are transmitted from the steering wheel to the vehicle wheels, not shown, via a steering gear 7. The other or second lever, the functions of which have been already broadly described above and also in the above-referenced co-pending application and which is coupled with the steering servo mechanism the drive of which is represented by the worm gear 3, is subdivided according to the present invention into partial levers 4 and 5; the first partial lever 4 is in the form of a worm wheel and the second partial lever 5 is formed as a fork. It is noted that the steering servo includes other well known elements such as became known with hydraulic servo arrangements; therefore, their details are not necessary for the understanding of the present invention for a man skilled in the art. The fork comprising the second partial lever 5 couples the second partial lever 5 with the differential gear 1 which delivers the steering instructions coming from the steering servo mechanism and from the driver to the steering gear 7 over a shaft 6. The steering gear 7 can be made in any known form, such as described in U.S. Pat. No. 1,967,482 and for this reason its detailed description here is not necessary. The drive shaft 8 of the steering gear 7 which can be a crank such as shown in the aforementioned U.S. Patent, is fixedly coupled for rotation with a disc 9. Between the disc 9, on one hand, and between the partial lever 4, on the other hand, spring means 10 and 11 are provided along with damping members 12 and 13. This last mentioned spring and damping arrangement serves for the transmission of an aiding momentum aiding the steering wheel during slow travel, as the momemtum coming from the steering servo is transmitted to the steering gear 7 and over it finally to the steering wheel. Said means 11, 13 have a high-pass overall effect.

Essential features of the present invention are the subdivision into two partial levers 4 and 5, as well as the presence of means which in dependence from the instantaneous steering angle either perform a coupling of both partial levers 4 and 5 so that within a predetermined steering angle there will be a momemtum as well as an angle support by the servo mechanism, while beyond such predetermined region by the fact that the coupling is released between the partial levers 4 and 5 and the second partial lever 5 becoming fixed on a rest or fixed part, such as the wall portion 14 of the housing for the steering arrangement in the present illustrative embodiment, whereby the angular support or aiding by the servo mechanism is disconnected. It is noted that even under the last-mentioned conditions the momemtum support to means 10 – 14 is still effective.

With respect to the terminology "momentum support" and "angular support" it is noted that the driver during passing a certain curve must produce on the steering wheel a certain momentun which he does by performing a certain angular rotation of the steering wheel, such as described in the afore-mentioned co-pending application. In the event the vehicle is provided with a momentum supporting device only, the driver in order that he could pass a certain curve still has to turn the steering wheel by the same angle as if he would not have the momentum supporting arrangement; however, the force which he has to exert on the steering wheel, that is, the momentum which he has to put into the steering wheel, is smaller or larger as a result of the presence of the momentum aiding arrangement and, according to the particular adjustment of the steering servo mechanism. In the event the vehicle is provided with an angular aiding arrangement only, the driver in order to pass the curve, similarly as above, has to exert the same momentum on the steering wheel; however, the steering wheel must be rotated only by a smaller angle, as the sterring servo will affect the rotation of the vehicle wheels by the necessary angle as a result of its servo effect. In the event the vehicle is provided with both a momentum and also an angular aiding arrangement, then the driver in order to pass the same curve, as mentioned above, must rotate the steering by a smaller angle, and also the momentum which he has to exert on the steering wheel is different from the momentum a driver would have to exert on the steering wheel of a vehicle not having the momentum aiding arrangement and attempting to pass the same curve.

In the particular embodiment the steering servo mechanism which is capable of performing momentum as well as angular aiding is symbolized only by the worm gear 3. It has been assumed that the momentum and angular aid is provided by the servo only within a predetermined steering angle range. Outside of such steering angle range, as will be seen and described in more detail hereinafter, the coupling between the partial levers 4 and 5 and the securing of the partial lever to the wall portion 14 will result in that only a momentum aid will be present through parts 10 – 13; however, the angular aiding of the servo mechanism as symbolized by the worm gear 3, is disconnected.

The angular aid is performed by the fact that the worm gear 3 of the steering servo will drive the partial lever 4 which is coupled with the other partial lever 5 within the predetermined steering angle range, so that it will be acted upon through the differential gear 1 by the steering servo mechanism. Such acting or swinging is released, however, as soon as the coupling between both partial levers 4 and 5 is released. On the other hand, the momentum aid remains effective since it is operative starting from the worm gear 3 of the steering servo, going over elements 10 – 13 and the disc 9 and is delivered into the steering gear 7 but not over the two partial levers 4 and 5. The coupling and releasing of the coupling among the parts mentioned above will be described in more detail hereinafter.

Figure 2:
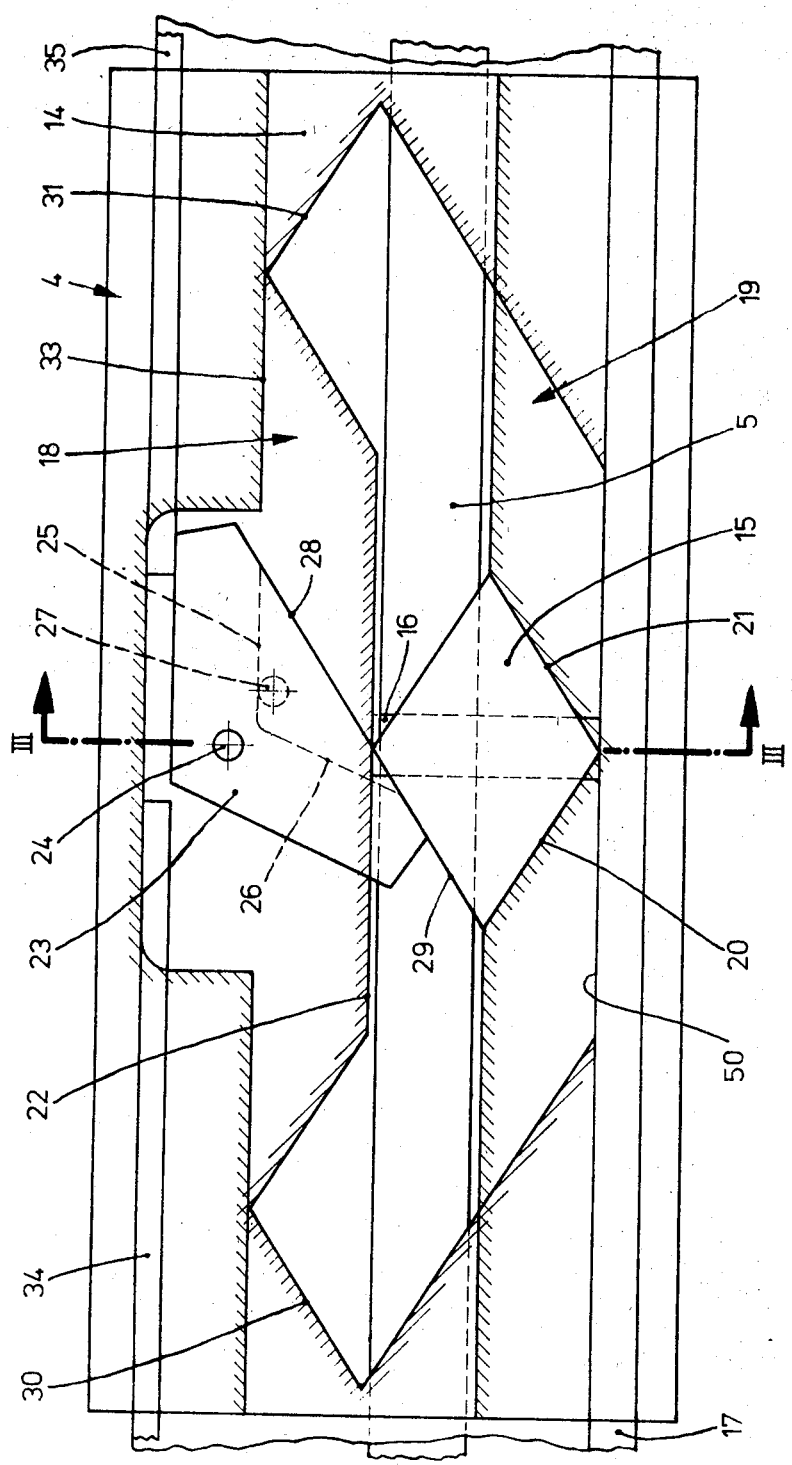
FIGS. 2 – 4 illustrate individual details of the overall arrangement of FIG. 1 in different operating states, but only of parts which serve for the establishing or releasing of the coupling between the partial levers and the steering servo.
Figure 3:
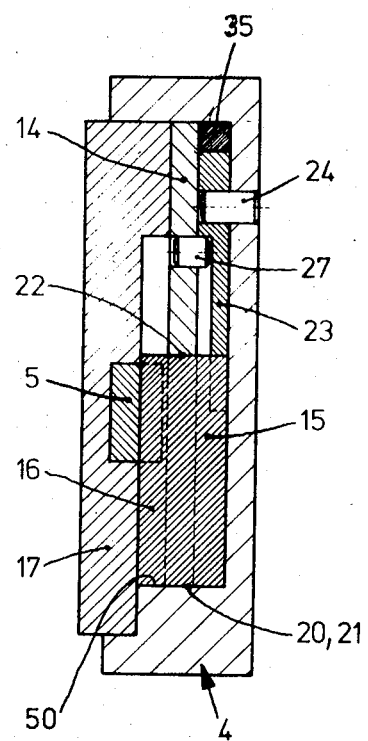
Figure 4:
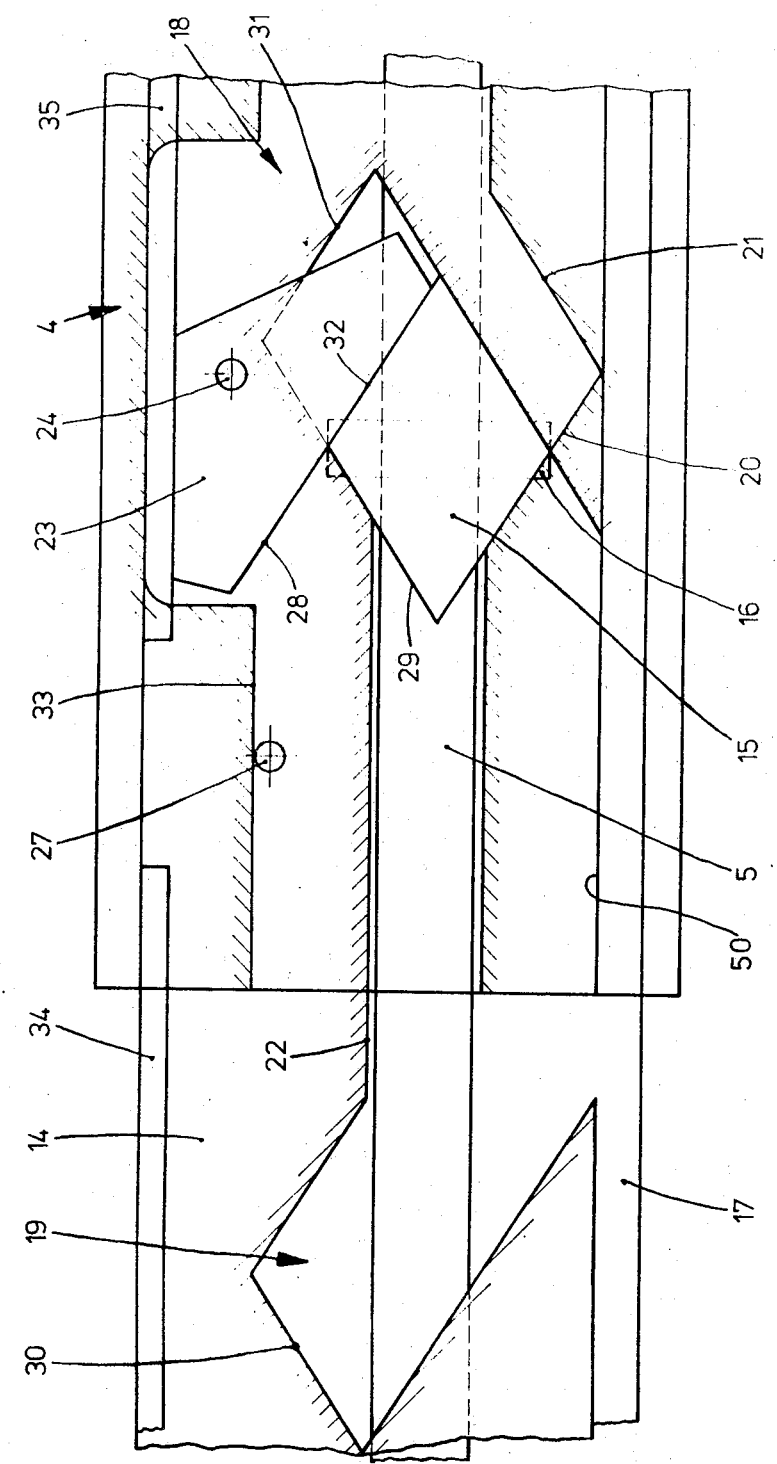

FIGS. 2 – 4 show an exemplary and illustrative embodiment of a device which is able to perform automatically the coupling and releasing of such coupling between the partial levers 4, 5 and the member 14 in dependence from the instantaneous steering angle. It is noted in connection with FIGS. 2 – 4 that they illustrate a device in a plan view at various steering angles, while FIG. 3 is a cross sectional view along III—III of FIG. 2. In FIG. 1 the dash-line box includes generally the elements 4, 5 and 14, and particularly coupling and decoupling of which is performed by the elements of FIGS. 2 – 4.

In order to simplify the reference to the parts of FIG. 1, the various parts in FIGS. 2–4 which have counterparts in FIG. 1 have been identified by the same reference numerals, although it has been assumed and shown that the various elements in the various figures may have undergone a linear relative displacement. The above statement that the elements may undergo linear relative movement is not a limitation on the scope of the present invention since, as has been assumed in connection with FIG. 1, the various components of the arrangement of FIG. 1 can also undergo rotational movement. In connection herewith it is necessary that the various parts in FIGS. 2 – 4 should be considered as being curved in the direction of their longitudinal axis, that is, the plane of such curving would point perpendicularly to the sheet of the drawing of FIG. 2. Then parts 4 and 5 would have a rotationally symmetrical shape and instead of moving along their axes, they would rotate about them.

The embodiments illustrated in FIGS. 2 – 4 differ in that the embodiment of FIG. 2, and consequently also of FIG. 3, shows a coupling member 15 in its first position, that is, in that position which has steering angles associated therewith which lie within the predetermined region of the steering angles. Within this region the steering servo mechanism must perform a momentum as well as a steering angle aid. The coupling member 15 which is illustrated here as a parallelogram has similar sides and a projection 16 formed on it in a transverse direction and in the form of a rail with which the coupling member 15 projects or protrudes into a groove 50 formed in the partial lever 5 also transversely. The partial lever 5 in the illustrated embodiment has been formed as a band or web and it moves in the embodiments illustrated in FIGS. 2 – 4 from left to the right and vice versa.

The first partial lever 4 in the embodiments illustrated in FIGS. 2 – 4 is made in the form of a slider of a transparent material which can slide on a base plate 17 (see FIG. 3) so that one can see the components lying under it in the plan view illustration of FIGS. 2 – 4. Between the base plate 17, on one hand, and between the partial lever 4, on the other hand, there is a fixed member 14 which is also formed as a plate.

It is essential for the operation of the device according to the present invention that recesses are provided in the first partial lever 4 and in the fixed member 14 into which the coupling member 15 simultaneously can protrude. These recesses which lie under each other are identified with the reference numeral 18 as the recess in the first partial lever 4 and by the reference numeral 19 as the recess in the fixed member 14. The recesses 18 and 19 overlap each other partially so that the coupling member 15 with its upper half protrudes into the recess 18 and with its lower half protrudes into the recess 19 simultaneously.

To understand more clearly the protruding of the coupling member 15 with its upper half into the recess 18 and with its lower half into the recess 19, reference should be had to FIG. 3. The member 17 has been designated as a base plate which physically lies underneath the other members, such as members 14 and 4 in FIG. 3. Under the condition that the coupling member 15 with its projection 16 which lies also underneath protrudes into the groove 50 formed in the second partial lever 5, it extends perpendicularly to the sheet of the drawing in FIG. 3. Referring to FIG. 3, it can be seen that the projection 16 is joined by a region which lies at the level of the member 14, that is, in the recess 19, while the upper half of the coupling member 15 which is above the formerly described lower half thereof, runs in the recess 18 of the partial lever 4. In order to illustrate better the essential recesses in FIGS. 2 – 4, the boundary edge of the recess 18 is provided with light shade lines with their edges directed to the right, while the boundary edges of the recess 19 are provided with left-directed light shade lines.

Considering now the contour of the recess 18 formed in the first partial lever 4, one may see that the surfaces 20 and 21 represent or characterize a camming region for the coupling member 15 which in FIG. 2 is illustrated as being located in its first position. In this position the coupling between the first partial lever 4 and the second partial lever 5 is established over the coupling member 15 so that there is accomplished by the steering servo mechanism a momentum as a steering angle aid. The first partial lever 4, by performing a motion in the horizontal direction in the embodiments illustrated in FIGS. 2 – 4, will carry with itself also the second partial lever 5. Such carrying along or camming is accomplished in that the coupling member 15 in this position is engaged not only in its camming profiles 20, 21 but also in the recess 19 formed in the rest or fixed member 14 lying under the camming profiles 20, 21 and illustrated as a free running region by the edge 22. The fixed member 14 in this position will not prevent the longitudinal movement of the second partial lever 5.

The same holds true also for a pivotable lever 23 which is mounted within the recess 18 formed in the first partial lever 4 for pivotable motion about a pivot axis 24 on the first partial lever 4. The pivotable lever 23 on its lower side, as shown in FIGS. 2 and 4, which is facing the fixed member 14, is provided with camming edges 25 and 26 which cooperate with a pin 27 provided on the fixed member 14.

In FIG. 2 the position of the pivotable lever 23 is illustrated in which the pivotable lever 23 with its front edge 28 lies just about still behind the free edge 29 of the coupling member 15 with respect to the direction of the motion. As soon as the coupling member 15 will move further to the right in FIG. 2, the pin 27 will cause a pivoting of the pivotable lever 23 into a position illustrated in FIG. 4. This pivotable lever 23 forms together with the corresponding structuring of the edges of the recesses 18 and 19 a switching arrangement for accomplishing the transverse motion of the coupling member 15 from its one to the other position and vice versa.

While the recess 19 forms within the active or effective region of the camming profile 20, 21 a sort of free running arrangement, the limits of the above-mentioned steering angle region are defined or characterized by the edges 30 and 31 of the recess 19 which represent the so-called arresting region. If the coupling member 15 in the illustrated embodiment is moved further to the right, as shown in FIG. 4, then the coupling member 5 will rise gradually out of the camming profiles 20, 21 and will reach the right arresting profile 31, as shown in this embodiment. As soon as the coupling member 15 is located completely in this arresting profile 31, which means that its edge 32 will lie against the edge 31, it is then completely moved out of the camming profile 20, 21 and protrudes with its upper half into the region of the recess 18 represented by the edge 33 which forms also a free running arrangement, so that now the coupling between both partial levers 4 and 5 is released, while on the other hand, the coupling between the second partial lever 5 and between the fixed member 14 is established. Inasmuch as the pivotable lever 23 is connected through its axis 24 with the first partial lever 4, it will during the gradual transitional movement of the coupling member 15 from its first position (FIG. 2) into its other position (FIG. 4) abut against the edge 31 and move more and more to the right and, thereby, out of the way of the coupling member 15. During a return movement of the first partial lever 4 to an extent that the steering angle will reach again the so-called predetermined region, the surface 28 of the pivotable lever 23 will act as a pressure surface and will lie against the edge 32 of the coupling member 15.

The pivotable lever 23 itself will be prevented by the rails 34 and 35 from performing a pivoting beyond a region of the control pin 27 and, accordingly, between these two rails 35 and 34 a permissible region of pivoting is provided for the pivotable lever 23.

It is obvious that the embodiment illustrated in FIG. 4 will have a mirror-like performance when the second partial lever 5 and the coupling member 15 will move so far to the left that the "left" limit of a predetermined steering angle region is reached. Under these conditions the surface 29 of the coupling member 15 will cooperate with the edge 30 of the recess 19 formed in the fixed member 14.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a motor vehicle, the combination of a steering arrangement with a steering servo mechanism a first and a second lever means for transmitting a rotational momentum, said first lever means being coupled for transmitting momentum corresponding to steering instructions of the driver, the other of said lever means being coupled for transmitting momenta produced by the steering servo mechanism, said first and said second lever means being coupled for transmitting said respective momenta with a lever arrangement coupled with the wheels of the vehicle, said first lever means providing a supporting momentum for the lever arrangement coupled with the vehicle wheels at the introduction thereto of the momenta delivered by the steering servo mechanism, means for transmitting supporting static momenta to said first lever when said steering servo mechanism delivers momenta thereto, said second lever means comprises a pair of partial levers, means for coupling a first one of said partial levers at all steering angles with said steering servo mechanism and with said means transmitting the aiding momentum which aid the steering, means for coupling the second one of said partial levers with said first lever means at all steering angles, said coupling means coupling said second partial lever with said first partial lever only at steering angles lying on a predetermined range of steering angles, a fixed member for arresting said second partial lever at steering angles lying beyond said predetermined range of steering angles.

2. The combination as claimed in claim 1, wherein said first partial lever means comprises a worm wheel means.

3. The combination as claimed in claim 1, including a differential gear means, said second partial lever means being in the form of a fork means, means for coupling said fork means with said differential gear means at all steering angles, means for coupling said first lever means with said differential gear means at all steering angles, said differential gear means adding the angular adjustment produced by said first lever means in response to the steering instructions of the driver and the angular adjustments produced by said second partial lever means in response to said steering servo mechanism in order to produce a steering angle and delivering said steering angle to a steering gear means.

4. The combination as claimed in claim 3, wherein said means for transmitting the supporting momentum is mounted between said first partial lever means and a member of said lever arrangement located on a driving shaft means of said steering gear means.

5. The steering arrangement as claimed in claim 1, wherein said fixed member comprises a wall portion of the housing of said steering arrangement.

6. The combination as claimed in claim 1, wherein means are provided for forming between said first and second partial lever means a positive coupling only within said predetermined range of steering angles, said positive coupling means forming a positive coupling between said second partial lever and said fixed member only outside of said predetermined range of said steering angle.

7. The combination as claimed in claim 6, wherein said second partial lever means comprises a coupling member mounted thereon slidably transversely with respect to the direction of movement of said second partial lever between two positions, said first partial lever means comprises a camming profile means, said coupling member of said second partial lever protruding into said profile means at one of said positions thereof associated with said predetermined range of the steering angles, said fixed member comprising arresting profile means, said coupling member of said second partial lever means in said second position thereof associated with regions of steering angles lying outside of said predetermined steering angle region protruding into said arresting profile means characterizing the limits of said predetermined region of said steering angles.

8. The combination as claimed in claim 7, wherein said profile means in said first partial lever means comprise recess means in said first partial lever means and said profile means in said fixed member comprises arresting profiles overlapping with said profiles in said first partial lever means and forming a free running portion for said coupling member located in the other of said positions thereof, the camming profile in said fixed member comprising a recess means forming an overlapping free running portion for said coupling member located in said one position thereof, said coupling member projecting simultaneously at all times into said recesses in said fixed member and in said first partial lever means.

9. The combination as claimed in claim 7, wherein said coupling member of said second partial lever means comprises a parallelogram means having one diagonal pointing in the direction of movement of said first partial lever means and mounted in a fashion fixed against rotation, said parallelogram means comprises surfaces formed as sliding surfaces cooperating with said profile means on said first partial lever means and said profile means on said fixed member in an aligned fashion to form a switching arrangement for causing said transverse movement of said coupling member into said first and second positions thereof.

10. The combination as claimed in claim 9, wherein said switching arrangement comprises a pivotable lever means mounted pivotable on said first partial lever means and comprising a counter surface for cooperating with said coupling member of said second partial lever means, said fixed member comprising projections for controlling and cooperating with said pivotable lever means, said coupling member during movement thereof into one of said first and second positions thereof cooperating with said pivotable lever means, said pivotable lever means being located during movement of said coupling member from said first position thereof into said other position thereof in front of said coupling member and during movement of said coupling member from said other position thereof into the first position thereof said pivotable lever member being located in the back of said coupling member, said counter surface of said pivotable lever member being shaped as a camming surface for cooperation with a surface of said coupling member in defining said predetermined region of steering angles.

11. The combination as claimed in claim 9, wherein said profile means on said first partial lever means having a depth corresponding to half of the diagonal of said coupling member pointing perpendicularly to the direction of movement of said first partial lever means.

* * * * *